United States Patent [19]
Lehman et al.

[11] Patent Number: 5,974,420
[45] Date of Patent: Oct. 26, 1999

[54] INFORMATION EXCHANGE OPERATOR FOR A TUPLESPACE

[75] Inventors: Tobin Jon Lehman, Los Gatos, Calif.; Stephen McLaughry, Eugene, Oreg.

[73] Assignee: International Business Machines Corporation, Armonk, N.Y.

[21] Appl. No.: 09/013,505

[22] Filed: Jan. 27, 1998

[51] Int. Cl.[6] .................................................. G06F 17/30
[52] U.S. Cl. .......................... 707/101; 707/2; 707/4; 707/10; 395/200.33; 395/200.49
[58] Field of Search ................................ 707/2, 3, 4, 10, 707/101; 395/705, 200.33, 200.78, 200.79, 200.49, 800.07

[56] References Cited

U.S. PATENT DOCUMENTS

| | | | |
|---|---|---|---|
| 5,396,623 | 3/1995 | McCall et al. | 707/101 |
| 5,815,556 | 9/1998 | Thuresson et al. | 379/93.25 |
| 5,848,141 | 12/1998 | Beck et al. | 379/201 |
| 5,854,837 | 12/1998 | Trader et al. | 379/265 |

OTHER PUBLICATIONS

Nejdl et al., "Evaluating recursive queries in distributed databases", IEEE Transactions on Knowledge and Data Engineering, vol. 5, No.1, Abstract Only, Feb. 1993.

*Primary Examiner*—Jean R. Homere
*Attorney, Agent, or Firm*—Merchant & Gould P.C.

[57] ABSTRACT

A method, apparatus, and article of manufacture for exchanging information in a computer-implemented database system. The present invention implements this exchange using a new operator known as a Rhonda operator. A Rhonda operator includes a tuple and template as arguments and, when performed, atomically swaps its tuple with a tuple from another Rhonda operator when both their templates match. More specifically, if two processes perform Rhonda operations, and each process' template argument matches the other process' tuple argument, then each process receives the other process' tuple as a result. This atomic synchronization can be performed for two or more Rhonda operators at a time.

17 Claims, 3 Drawing Sheets

INFORMATION EXCHANGE OPERATOR FOR A TUPLESPACE

BACKGROUND OF THE INVENTION

1. Field of the Invention.

The present invention generally relates to a computer-implemented database management system, and in particular, to a method for exchanging information in a tuplespace.

2. Description of Related Art.

A Tuplespace is a globally shared, associatively addressed memory space that is organized as a grouping of tuples. The Tuplespace concept is further described in the following: David Gelernter and Arthur J. Bernstein, "Distributed Communication via Global Buffer," PODC 1982, pp. 10–18, 1982 (hereinafter referred to as Gelernter 82); Nicholas Carriero and David Gelernter, "Linda in Context," CACM 32(4), pp. 444–458, 1984 (hereinafter referred to as Carriero 84); and David Gelernter, "Generative Communication in Linda," TOPLS 7(1), pp. 80–112, 1985 (hereinafter referred to as Gelernter 85); all of which are incorporated by reference herein.

The basic element of a Tuplespace system is a tuple, which is simply a vector of typed values or fields. Templates are used to associatively address tuples via matching techniques. A template (or anti-tuple) is similar to a tuple, but some (zero or more) fields in the vector may be replaced by typed placeholders (with no value) called formal fields. A formal field in a template is said to match a tuple field if they have the same type. If the template field is not formal, both fields must also have the same value. A template matches a tuple if they have an equal number of fields and each template field matches the corresponding tuple field.

Table 1 below illustrates some simple tuples and templates.

a "tuple not found" value if no matching tuple is immediately available.

Tuplespace provides a simple yet powerful mechanism for inter-process communication and synchronization, which is the crux of parallel and distributed programming. A process with data to share "generates" a tuple and places it into the Tuplespace. A process requiring data simply requests a tuple from the space. Although not quite as efficient as message-passing systems, Tuplespace programs are typically easier to write and maintain, for a number of reasons:

- Destination uncoupling (fully anonymous communication): Most message passing systems are partially anonymous: it is not necessary for the receiver of a message to identify the sender, but the sender always has to specify the receiver. The creator of a tuple, however, requires no knowledge about the future use of that tuple, or its destination.
- Space uncoupling: Since tuples are retrieved using an associative addressing scheme, multiple address-space-disjoint processes access tuples in the same way.
- Time uncoupling: Tuples have their own lifespan, independent of the processes that generated them, or any processes that may read them. This enables time-disjoint processes to communicate seamlessly.

Tuplespace extends message passing systems with a simple data repository that features associated addressing. Conceptually, it ranks above a pure message passing system in terms of function, but far below relational database systems, since most implementations do not include transactions, persistence or any significant form of query facility.

Research into Tuplespace systems has proceeded at a steady pace for the past fifteen years, but has been primarily targeted at the high-performance parallel computing market. Recently, interest in Tuplespace has developed among researchers in distributed systems.

TABLE 1

SIMPLE TUPLE EXAMPLES

| Sample Tuple | Description | Does the Sample Match the Template (Float, "Hellow World" int) | Does the Sample Match the Template (Float String, 345.0) |
|---|---|---|---|
| <2.24, "hello world", 345> | A tuple with three fields: (1) a float with the value 2.24, (2) a string with the value "hello world", and (3) an integer with the value 345. | Yes | No |
| <2,24, "hello world", 345.0> | A tuple with three fields: (1) a float with the value 2.24, (2) a string with the value "hello world", and (3) a float with the value 345.0. | No | Yes |
| < > | A tuple with 0 fields. | No | No |

A tuple is created by a process and placed in the Tuplespace via a write primitive. Tuples are read or removed with read and take primitives, which take a template and return the first matching tuple. (Note that, because the space is unstructured, the choice among multiple matching tuples is arbitrary and implementation-dependent.) Most Tuplespace implementations provide both blocking and non-blocking versions of the tuple retrieval primitives. A blocking read, for example, waits until a matching tuple is found in the Tuplespace, while a non-blocking version will return For example, SUN Microsystems has recently publicized an internal project based on Tuplespaces, called "Javaspaces", as described in the JavaSpace™ Specification, Revision 0.4, Sun Microsystems, Inc., 1997, which is incorporated by reference herein. Also, computer science departments at universities around the country are now giving programming assignments that feature Tuplespaces in Java™.

Notwithstanding these improvements, there remains a need in the art for enhanced functionality for use with Tuplespaces. The present invention provides such enhanced functionality directed to the exchange of information between clients or processes using a Tuplespace.

SUMMARY OF THE INVENTION

To overcome the limitations in the prior art described above, and to overcome other limitations that will become apparent upon reading and understanding the present specification, the present invention discloses a method, apparatus, and article of manufacture for exchanging information in a computer-implemented database system. The present invention implements this exchange using a new operator known as a Rhonda operator. A Rhonda operator includes a tuple and template as arguments and, when performed, atomically swaps its tuple with a tuple from another Rhonda operator when both their templates match. More specifically, if two processes perform Rhonda operations, and each process' template argument matches the other process' tuple argument, then the tuples are returned to both processes. This atomic synchronization can be performed for two or more Rhonda operators at a time.

An object of the present invention is to extend the functionality available in Tuplespaces. Another object of the present invention is to provide a mechanism for exchanging information between two or more processes. An additional object is to provide synchronous, anonymous rendezvous and data exchange. Yet another object of the present invention is to provide a mechanism for controlling multiple processes. Still another object is to provide "barrier synchronization" among a dynamically defined group of processes.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention, known as "T Spaces," comprises a network middleware system that uses a Tuplespace model of interaction for building a globally visible communications buffer. T Spaces is a superset of the Tuplespace model that implements the standard set of Tuplespace operators: read, in (take), and out (write), as well as both blocking and non-blocking versions of take and read, and set oriented operators such as scan and consuming scan. The present invention provides a Rhonda operator that significantly extends the functionality associated with Tuplespaces.

Hardware Environment

Figure 1:
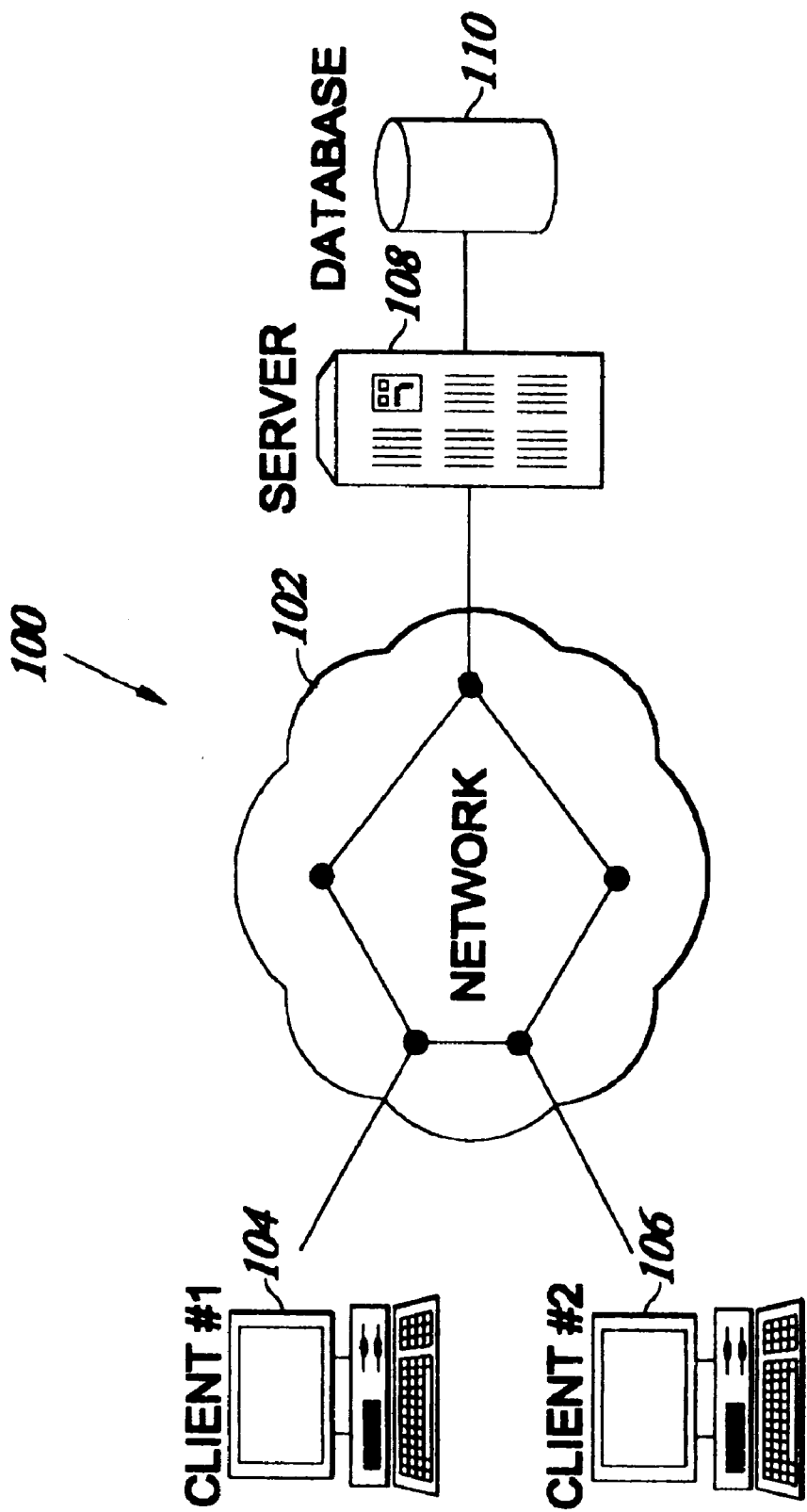
FIG. 1 schematically illustrates the environment of the preferred embodiment of the present invention, and more particularly, illustrates a typical distributed computer system using a network to connect T Spaces clients to a T Spaces server.

FIG. 1 schematically illustrates the environment of the preferred embodiment of the present invention, and more particularly, illustrates a typical distributed computer system 100 using a network 102 to connect one or more T Spaces clients 104 and 106 to a T Spaces server 108. A typical combination of resources may include clients 104 and 106 that are implemented on personal computers or workstations, and servers 108 that are implemented on personal computers, workstations, minicomputers, or mainframes. The network 102 may comprise networks such as LANs, WANs, SNA networks, and the Internet.

Following the Tuplespace model, a T Spaces client 104 or 106 communicates with the T Spaces server 108 via tuples, i.e., ordered vectors of fields that each describe a type and a value. Moreover, the T Spaces clients 104 and 106 communicate with each other via the T Spaces server 108.

For example, T Spaces client 104 may issue a write call to insert a <test1> tuple into the T Spaces server 108. The <test1> tuple is sent to the T Spaces server 108, where it is stored in a T Spaces database 110 managed by the T Spaces server 108. Then, T Spaces client 106 issues a read query, specifying <test1> as the query template. The query template is sent to the T Spaces server 108 and is used to query the T Spaces database 110. The <test1> tuple is found, and a copy of the tuple is returned to the T Spaces client 106.

The present invention is generally implemented using computer programs, which are executed by the T Spaces clients 104 and 106 and/or the T Spaces server 108. These computer programs cause the T Spaces clients 104 and 106 and/or the T Spaces server 108 to perform the desired functions as described herein. Generally, the computer programs are tangibly embodied in and/or readable from a device, carrier, or media, such as a memories, data storage devices, and/or remote devices coupled to the computer via data communications devices. Thus, the present invention may be implemented as a method, apparatus, or article of manufacture using standard programming and/or engineering techniques to produce software, firmware, hardware, or any combination thereof The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

T Spaces Clients

Figure 2:
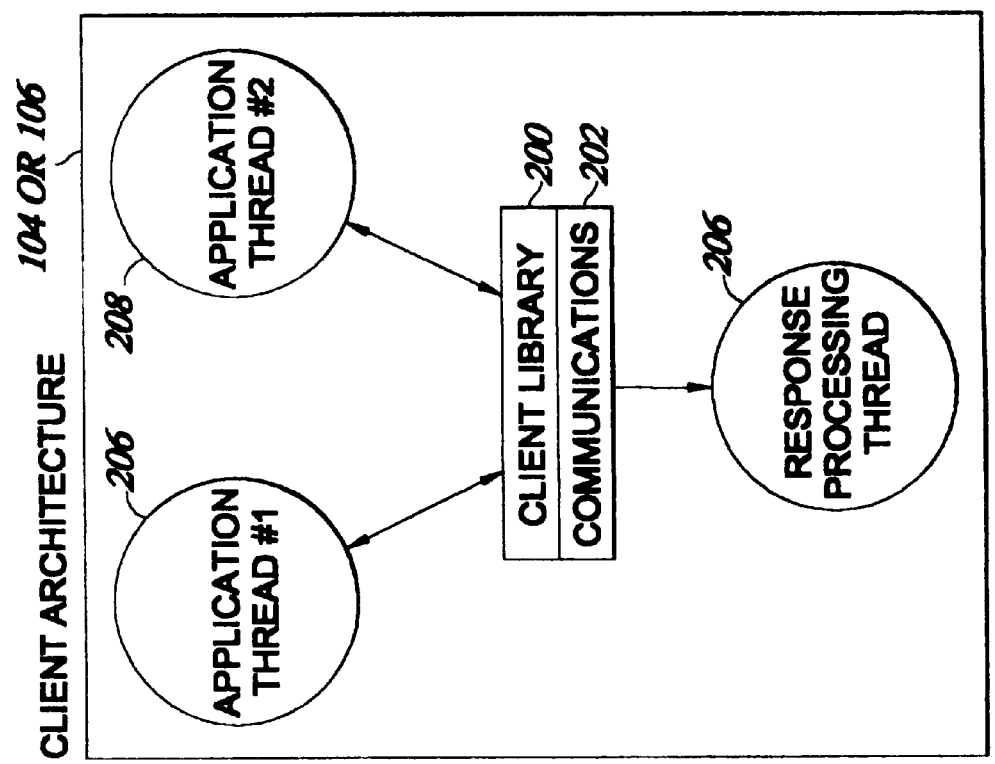
FIG. 2 illustrates the implementation of the T Spaces client according to the present invention.

FIG. 2 illustrates the implementation of the T Spaces client 104 or 106 according to the present invention. The client 104 or 106 includes a client library 200 that comprises a Tuplespace class, a communication library 202 for sending commands or requests to the T Spaces server 108, and a response processing thread 204 that processes responses received from the T Spaces server 108. In this example, the T Spaces client 104 or 106 executes two application threads 206 and 208. The application threads 206 and 208 manipulate instances of the Tuplespace class from the client library 200, which use the communication library 202 to send requests to the T Spaces server 108. Application threads 206 and 208 share a single monitor-protected outgoing TCP/IP stream, while the response processing thread 204 handles the single incoming TCP/IP stream.

All communication between the T Spaces client 104 or 106 and T Spaces server 108 is preferably non-blocking. In this way, multiple threads in the same Java™ virtual machine of the T Spaces client 104 or 106 can share a single TCP/IP connection to each T Spaces server 108. If a thread in a T Spaces client 104 or 106 issues a blocking request, it is blocked in the communication library 202 after sending the request and is awoken by the response processing thread 204 when the response arrives.

The response processing thread 204 associates responses from the T Spaces server 108 with requests from the application threads 206 or 208 using a list of outstanding requests, wherein each request is assigned a unique request identifier. A callback object is inserted into the outstanding request list using the request identifier as a key, wherein the callback object has two methods: (1) a wait-for-response method decrements a semaphore, thereby blocking the requesting application thread 206 or 208 until the response arrives; and (2) a call method increments the semaphore, thereby unblocking the requesting application thread 206 or 208.

T Spaces Server

Figure 3:
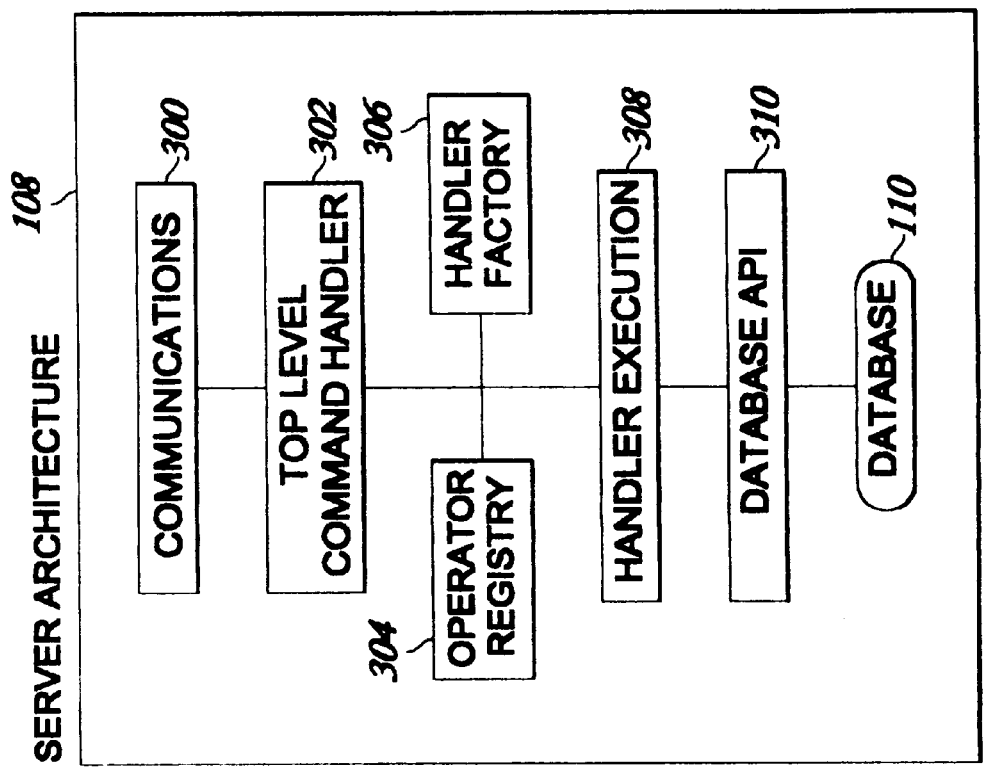
FIG. 3 illustrates the architecture of the T Spaces server according to the present invention.

FIG. 3 illustrates the architecture of the T Spaces server 108 according to the present invention. The T Spaces server 108 includes a Communications layer 300, Top-Level Command Handler 302, Operator Registry 304, Handler Factory 306, Handler Execution layer 308, Database API (Application Programming Interface) 310, and Database 110 (which actually stores the Tuplespace). The T Spaces server 108 is multi-threaded, with each request from a T Spaces client 104 or 106 handled by an independent thread.

A command or request originates as a method invocation on a T Spaces client 104 or 106. All the information needed to process the request is bundled into the request by the communications layer 202 of the T Spaces client 104 or 106, sent to the T Spaces server 108, and then un-bundled by the Communications layer 300 on the T Spaces server 108 (as indicated by Step 400). Generally, the request comprises one or more operators and its associated parameters (if any).

The T Spaces server 108 dispatches the Top-Level Command Handler 302 upon receiving the request (as indicated by Step 402). The main function of the Top-Level Command Handler 302 is to locate the appropriate Handler Factory 306 for the operator in the request using the Operator Registry 304.

Generally, operators are organized in families. For example, one embodiment of the present invention may include a family for the basic T Space or Tuplespace operators (e.g., Write( ), Take( ), Read( ), Rhonda( ), etc.), a family for administration operators (e.g., NewUser( ), ChangeUser( ), SetPassword( ), etc.) and a family for operators that manage the T Space system itself (e.g., NewTupleSpace( ), AddFactory( ), DeleteFactory( ), AddHandler( ), DeleteHandler( ), etc.). There is usually one Handler Factory 306 for a particular family.

Given an operator, a tuple, a T Spaces client 104 or 106 identifier, and/or an indication of access control privileges for a T Spaces client 104 or 106, the Handler Factory 306 produces an appropriate handler for the operator (as indicated by Step 404), wherein the handler is an implementation (e.g., program code) for the operator. This architecture provides the maximum flexibility since the Handler Factory 306 may custom-tailor the implementation of the operator's handler to the types of operands or parameters provided with the operator and/or the identity of the invoker of the operator and/or the access control privileges of the invoker.

The operator's handler is dispatched for execution by the Handler Execution 308 (as indicated by Step 406), using the parameters of the operator as input thereto. The handler executes, and then may pass its results back up to the Top-Level Command Handler 302, which in turn may pass the results back to the T Spaces client 104 or 106 via the Communications layer 300.

Generally, handlers act on a Tuplespace stored in the T Spaces database 110 through the Database API layer 310. The Database API layer 310 provides the core database functionality necessary to manipulate the Tuplespace. For flexibility and scalability reasons, different Database API 110 implementations may be used in the present invention.

Basic T Spaces Tuple Commands

As described above, the basic T Spaces tuple operations are write, take, and read, wherein write operations store a tuple argument in the T Spaces database 110, and take operations and read operations each use a tuple template argument which is "matched" against the tuples in the T Spaces database 110. A take operation removes and returns the first matching tuple in the T Spaces database 110, while a read operation returns a copy of the matched tuple, leaving the T Spaces database 110 unchanged. If no match is found, take and read operations each return the Java™ type null, and leave the T Spaces database 110 unchanged. Blocking versions of these operations are also provided, e.g., wait-to-take and wait-to-read, which (if no match is found) block until a matching tuple is written by another process. (Linda programmers will recognize the semantics of these primitives as out, inp, rdp, in and rd.)

T Spaces also includes scan, consuming-scan, and count operations. Scan and consuming-scan operations are multi-set versions of read and take, respectively, and return a "tuple of tuples" that matches the template argument. The count operation simply returns an integer count of the matching tuples.

In addition to these basic operators, the present invention also implements a new operator known as a Rhonda operator. A Rhonda operator includes a tuple and template as arguments and, when performed, atomically swaps its tuple with a tuple from another Rhonda operator when both the process' templates match the other process' tuples. More specifically, if two processes perform Rhonda operations, and each process' template argument matches the other process' tuple argument, then each process receives the other process' tuple as a result. This atomic synchronization can be performed for two or more Rhonda operators at a time.

Rhonda Operator

The Rhonda operator is used when two T Spaces clients 104 and 106 exchange information via the T Spaces server 108. Each Rhonda operator includes tuple (e.g. <"foo",25, 3.14159>) and template (e.g. <<String>,<Integer>, <Float>>) arguments A first Rhonda operator (invoked by a first client 104 or 106) atomically swaps its tuple with a tuple from a second Rhonda operator (invoked by a second client 104 or 106) if and only if the template from the first Rhonda operator matches the tuple from the second Rhonda operator and the template from the second Rhonda operator matches the tuple from the first Rhonda operator. For example, if client 104 performs Rhonda (("A", 17),("B",<Integer>))

(offering its tuple <"A", 17> while asking for any other tuple that matches the template <"B",<Integer>>), while client 106 performs Rhonda (("B",25),("A",<int>)), THEN client 104 will receive the tuple ("B",25), while client 106 will receive ("A",17).

To state this more formally, if α is a tuple and β is a template, then given two Rhonda operators, ρ1 (α1; β1) and ρ2 (α2; β2), ρ1 matches ρ2 if and only if β1 matches α2 and β2 matches α1. In the event of a match, ρ1 returns α2, and ρ2 returns α1. Note that these results do not depend on the order of execution of ρ1 and ρ2.

While it is possible to simulate the "all or nothing" atomic nature of the Rhonda operator using in and out primitives within a transaction context (adding transaction capability to the T Spaces server 108 and then calling the in and out operators from within a single transaction), it is impossible to capture the information hiding that the Rhonda operator allows. By putting the match and exchange in a single operator, the present invention allows blind, anonymous exchanges based entirely on the matching query templates and not on any properties (or attempted deceits by the participants).

Although the Rhonda operator is intended to provide synchronous, anonymous rendezvous and data exchange, it can be used in other ways to control multiple processes. By adding a group name parameter to the Rhonda operator, all of the Rhonda operators sharing a group name will not return until all the members of the group are satisfied. This embodiment of the Rhonda operator is known as the "M-Rhonda" operator.

If three processes all specified "group 1" as the group name, then when process 3 adds M-Rhonda (("C",35),("A", <Integer>)) to the existing Rhonda operator tuples offered by process 1, M-Rhonda (("A", 17) ("B",<Integer>)), and process 2, M-Rhonda (("B",25),("C",<Integer>)), the entire operation is satisfied. Another embodiment of M-Rhonda takes both a group name and a count (which would probably be the more commonly used embodiment). The entire operation is satisfied when all of the participating processes have been accounted for and have all matched something in the group.

In another embodiment, the M-Rhonda operator can also easily be extended to provide "barrier synchronization" among a dynamically defined group of processes. This embodiment of the M-Rhonda operator takes a single tuple containing a string and an integer x. The string is used as the name of the group, and x represents the number of processes in the group. As soon as x processes execute the matching M-Rhonda operator, they are all allowed to continue.

The Rhonda Operator Implementation

Figure 4:
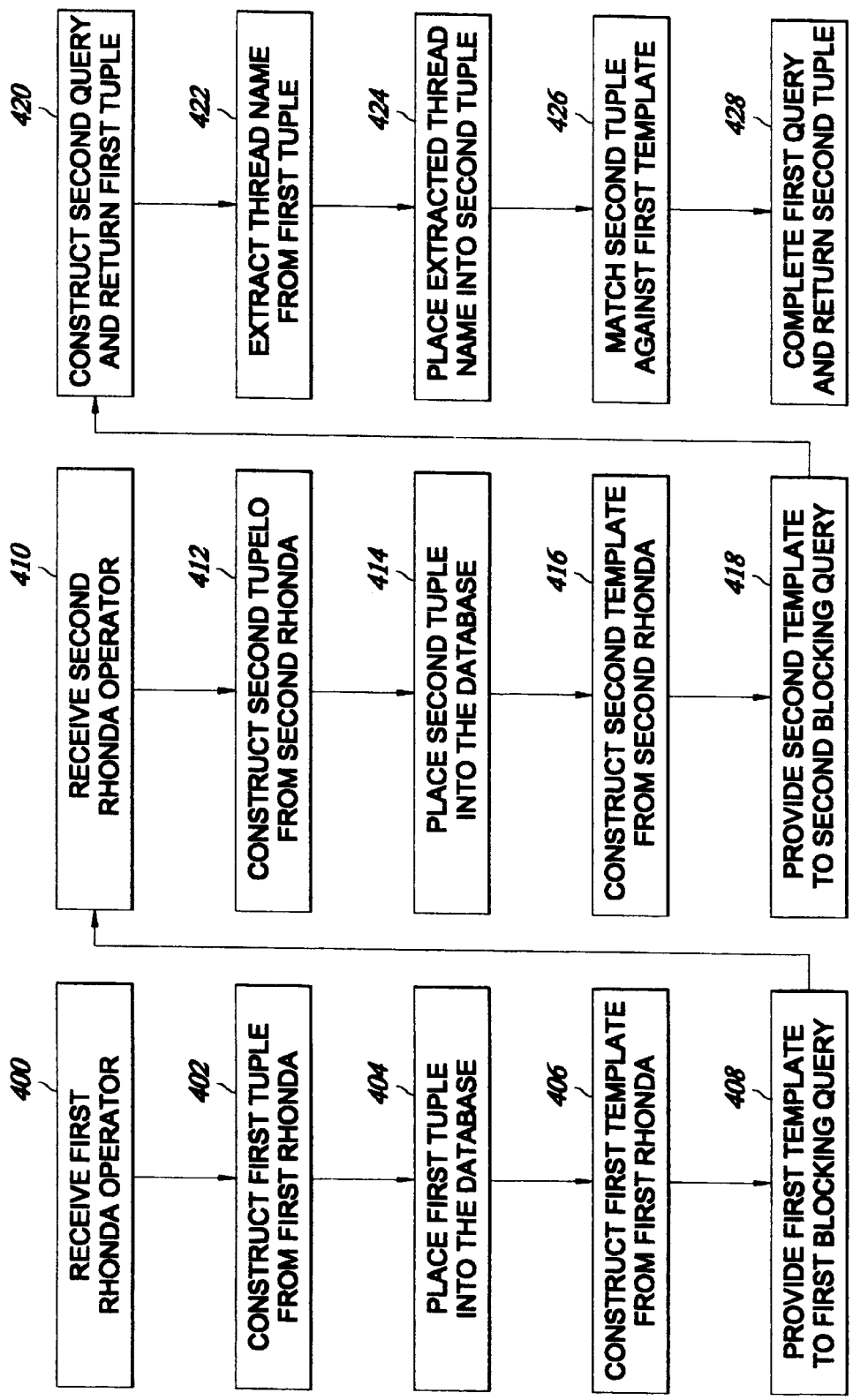
FIG. 4 is a flowchart that illustrates the logic performed by the T Spaces server according to the present invention.

FIG. 4 is a flowchart that illustrates the logic performed by a handler executed in the T Spaces server 108 when performing the Rhonda operator according to the present invention.

Block 400 represents the T Spaces server 108 receiving a first Rhonda operator request ρ1.

Block 402 represents the T Spaces server 108 constructing a first tuple τ1 using a tuple α1, template β1, and a unique thread name for the thread on the T Spaces server 108 performing ρ1.

Block 404 represents the T Spaces server 108 placing the first tuple τ1 into the T Spaces database 110.

Block 406 represents the T Spaces server 108 constructing a first template for a second tuple τ2, using (in order) β1, α1, and the same unique thread name for the thread on the T Spaces server 108 performing ρ1.

Block 408 represents the T Spaces server 108 providing the first template to a first blocking query, wherein the thread on the T Spaces server 108 performing ρ1 awaits a match from the query.

Block 410 represents the T Spaces server 108 receiving a second Rhonda operator request ρ2.

Block 412 represents the T Spaces server 108 constructing a second tuple τ2 using a tuple α2, template β2, and a unique thread name for the thread on the T Spaces server 108 performing ρ2.

Block 414 represents the T Spaces server 108 placing the second tuple τ2 into the T Spaces database 110.

Block 416 represents the T Spaces server 108 constructing a second template for the first tuple τ1, using (in order) β2, α2, and a string wildcard for a thread name.

Block 418 represents the T Spaces server 108 providing the template to a second blocking query, wherein the thread on the T Spaces server 108 performing ρ2 awaits a match from the second blocking query.

Block 420 represents the T Spaces server 108 completing the second blocking query (since (β2 matches α1, etc.) and returning the τ1 tuple to the thread on the T Spaces server 108 performing ρ2.

Block 422 represents the T Spaces server 108 extracting the unique thread name from the τ1 tuple during the execution of the thread on the T Spaces server 108 performing ρ2.

Block 424 represents the T Spaces server 108 placing the unique thread name from the τ1 tuple into the τ2 tuple (which also contains, in order, α2 and ,β2) in the T Spaces database 110 during the execution of the thread on the T Spaces server 108 performing τ2.

As soon as the τ2 tuple is placed in the T Spaces database 110, Block 426 represents the T Spaces server 108 matching the τ2 tuple template constructed by the thread on the T Spaces server 108 performing ρ1.

Block 428 represents the T Spaces server 108 completing the first blocking query (since β1 matches α2, etc.) and returning the τ2 tuple to the thread on the T Spaces server 108 performing ρ1.

Notice that the correct operation of the handler for the Rhonda operator relies on the fact that there is a unique thread for each client 104 or 106 connection to the T Spaces server 108, and hence a unique thread name for each connected client 104 or 106. In order to perform the Rhonda operator using in and out primitives, it would be necessary to guarantee a similar unique naming property of the clients 104 or 106 themselves, rather than the threads that handle their connections. In a large distributed system, this sort of guarantee is difficult to provide.

Conclusion

This concludes the description of the preferred embodiment of the invention. In summary, the present invention discloses a method, apparatus, and article of manufacture for exchanging information in a computer-implemented database system. The present invention implements this exchange using a new operator known as a Rhonda operator. A Rhonda operator includes a tuple and template as arguments and, when performed, atomically swaps its tuple with a tuple from another Rhonda operator when both their templates miatch. More specifically, if two processes perform Rhonda operations, and each process' template argument matches the other process' tuple argument, then each process receives the other process' tuple as a result. This atomic synchronization can be performed for two or more Rhonda operators at a time.

The following describes some alternative ways of accomplishing the present invention. Those skilled in the art will recognize that different computer programming languages, database systems, operating environments, and operating systems could be substituted for those described herein. Those skilled in the art will recognize that the present invention could be used any type of computer system, and need not be limited to a client-server architecture. Those skilled in the art will recognize that the present invention could be used with many types of handler implementation and need not be limited to the example described herein. Those skilled in the art will recognize that alternate approaches to operators and handlers could be substituted for the approach described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of exchanging information in a computer-implemented database system, comprising the steps of:
   (a) receiving a first operator having a first tuple and first template as arguments thereto and a second operator having a second tuple and second template as arguments thereto;
   (b) determining whether the second tuple matches the first template and the first tuple matches the second template; and
   (c) returning the second tuple as a result for the first operator and the first tuple as a result for the second operator when the second tuple matches the first template and the first tuple matches the second template.

2. The method of claim 1 above, wherein the results do not depend on an order of execution of the first and second operators.

3. The method of claim 1 above, further comprising the step of using a unique thread name to ensure correct operation of a handler for the first or second operators.

4. The method of claim 1 above, wherein:
   (1) the step of receiving (a) further comprises the step of receiving a third operator having a third tuple and third template as arguments thereto;
   (2) the step of determining (b) further comprises the step of determining whether the first tuple matches the second template, the second tuple matches the third template, and the third tuple matches the first template; and
   (3) the step of returning (c) further comprises the step of returning the second tuple as a result for the first operator, the third tuple of as a result for the second operator, and the first tuple as a result for the third operator when the first tuple matches the second template, the second tuple matches the third template, and the third tuple matches the first template.

5. The method of claim 4 above, wherein the first, second, and third operators each have a group name as an argument thereto.

6. The method of claim 5 above, wherein the group name indicates that the results are not returned until all operators having the group name as an argument are satisfied.

7. The method of claim 5 above, wherein the first, second, and third operators each have a number as an argument thereto.

8. The method of claim 7 above, wherein the group name and counter indicates that the results are not returned until a count of operators having the group name as an argument equal to the number are satisfied.

9. The method of claim 1 above, further comprising the step of using a unique thread name to ensure correct operation of a handler for the first, second, or operators.

10. The method of claim 1 above, wherein:
    (1) the step of receiving (a) further comprises the step of receiving a third operator having a third template and third tuple as arguments thereto;
    (2) the step of determining (b) further comprises the step of determining whether the first tuple matches the third template, the second tuple matches the first template, and the third tuple matches the second template; and
    (3) the step of returning (c) further comprises the step of returning the third tuple as a result for the first operator, the first tuple of as a result for the second operator, and the second tuple as a result for the third operator when the first tuple matches the third template, the second tuple matches the first template, and the third tuple matches the second template.

11. The method of claim 10 above, wherein the first, second, and third operators each have a group name as an argument thereto.

12. The method of claim 11 above, wherein the group name indicates that the results are not returned until all operators having the group name as an argument are satisfied.

13. The method of claim 11 above, wherein the first, second, and third operators each have a number as an argument thereto.

14. The method of claim 13 above, wherein the group name and counter indicates that the results are not returned until a count of operators having the group name as an argument equal to the number are satisfied.

15. The method of claim 10 above, further comprising the step of using a unique thread name to ensure correct operation of a handler for the first, second, or third operators.

16. A computer-implemented apparatus for exchanging information in a computer-implemented database system, comprising:
    (a) a computer-implemented database system; and
    (b) one or more instructions, performed by the system, for receiving a first operator having a first template and first tuple as arguments thereto and a second operator having a second template and second tuple as arguments thereto;
    (c) one or more instructions, performed by the system, for determining whether the second tuple matches the first template and the first tuple matches the second template; and (d) one or more instructions, performed by the system, for returning the second tuple as a result for the first operator and the first tuple as a result for the second operator when the second tuple matches the first template and the first tuple matches the second template.

17. An article of manufacture comprising a carrier tangibly embodying one or more instructions that when executed by a computer causes the computer to perform a method for exchanging information in a computer-implemented database system, the method comprising the steps of:

(a) receiving a first operator having a first template and first tuple as arguments thereto and a second operator having a second template and second tuple as arguments thereto;

(b) determining whether the second tuple matches the first template and the first tuple matches the second template; and (c) returning the second tuple as a result for the first operator and the first tuple as a result for the second operator when the second tuple matches the first template and the first tuple matches the second template.

* * * * *